US006959292B1

(12) United States Patent
Pintsov

(10) Patent No.: US 6,959,292 B1
(45) Date of Patent: Oct. 25, 2005

(54) METHOD AND SYSTEM FOR PROVIDING VALUE-ADDED SERVICES

(75) Inventor: Leon A. Pintsov, West Hartford, CT (US)

(73) Assignee: Pitney Bowes Inc., Stamford, CT (US)

(*) Notice: Subject to any disclaimer, the term of this patent is extended or adjusted under 35 U.S.C. 154(b) by 577 days.

(21) Appl. No.: 09/693,285

(22) Filed: Oct. 20, 2000

(51) Int. Cl.[7] .............................................. G06F 17/60
(52) U.S. Cl. ............................ 705/62; 705/60; 705/63; 364/646
(58) Field of Search .................... 705/60–62, 401–411, 705/63

(56) References Cited

U.S. PATENT DOCUMENTS

| | | | |
|---|---|---|---|
| 4,106,060 A | 8/1978 | Chapman, Jr. | |
| 5,008,827 A | 4/1991 | Sansone et al. | |
| 5,058,008 A | 10/1991 | Schumacher | |
| 5,388,049 A | 2/1995 | Sansone et al. | |
| 5,586,036 A * | 12/1996 | Pintsov | 705/408 |
| 5,612,884 A | 3/1997 | Haines | |
| 5,612,889 A | 3/1997 | Pintsov et al. | |
| 5,648,916 A | 7/1997 | Manduley | |
| 5,699,258 A | 12/1997 | Thiel | |
| 5,712,712 A | 1/1998 | Sayward | |
| 5,724,245 A | 3/1998 | Maher et al. | |
| 5,726,894 A | 3/1998 | Sansone | |
| 5,737,729 A | 4/1998 | Denman | |
| 5,768,132 A | 6/1998 | Cordery et al. | |
| 5,794,789 A | 8/1998 | Payson et al. | |
| 5,805,810 A | 9/1998 | Maxwell | |
| 5,826,034 A | 10/1998 | Albal | |
| 5,826,247 A | 10/1998 | Pintsov et al. | 705/404 |
| 5,859,967 A | 1/1999 | Kaufeld et al. | |
| 5,875,302 A | 2/1999 | Obhan | |
| 5,892,909 A | 4/1999 | Grasso et al. | |
| 5,918,220 A | 6/1999 | Sansone et al. | |
| 5,936,865 A | 8/1999 | Pintsov et al. | |
| 5,953,427 A | 9/1999 | Cordery et al. | |

(Continued)

FOREIGN PATENT DOCUMENTS

GB 2328306 A * 2/1999 ............ G06K 5/00

(Continued)

OTHER PUBLICATIONS

USPS, "3 Special Services", downloaded Jan. 26, 2003, from the USPS web site, pp. 11-12.*

(Continued)

*Primary Examiner*—Firmin Backer
(74) *Attorney, Agent, or Firm*—Charles R. Malandra; Angelo N. Chaclas

(57) ABSTRACT

A system and method is disclosed for providing confirmation relating to the distribution of a mailpiece within an international mailing system. The invention includes a determination of postal data required for performing value-added services desired for the mailpiece. The value-added services data includes addressing information for a return receipt from an intended mailpiece recipient through a final handling postal authority and a first postal authority to the original mailer. A machine readable mark is created which includes return data and value-added services data. During the delivery process, the value-added service is captured by the final handling postal authority, the mailpiece is delivered to the intended recipient, the value-added service is performed, and the data related to the delivery is captured by the final handling postal authority. The final handling postal authority then transmits this information to the first handling postal authority who then communicates the information to the original mailer. The invention is practiced such that the identity of the mailer is disclosed only to the original postal authority and not to subsequent handling postal authorities.

21 Claims, 6 Drawing Sheets

U.S. PATENT DOCUMENTS

| | | | | |
|---|---|---|---|---|
| 5,978,781 | A | 11/1999 | Sansone | 705/408 |
| 5,987,441 | A | 11/1999 | Lee et al. | |
| 6,014,688 | A | 1/2000 | Venkatraman et al. | |
| 6,018,774 | A | 1/2000 | Mayle et al. | |
| 6,032,138 | A | 2/2000 | McFiggans et al. | |
| 6,038,601 | A | 3/2000 | Lambert et al. | |
| 6,047,264 | A | 4/2000 | Fisher et al. | |
| 6,047,273 | A | 4/2000 | Vaghi | |
| 6,052,671 | A | 4/2000 | Crooks et al. | |
| 6,055,520 | A | 4/2000 | Heiden et al. | 705/410 |
| 6,064,981 | A | 5/2000 | Barni et al. | 705/26 |
| 6,072,862 | A | 6/2000 | Srinivasan | |
| 6,101,487 | A | 8/2000 | Yeung | |
| 6,112,193 | A | 8/2000 | Dlugos et al. | |
| 6,216,127 | B1 | 4/2001 | Gans et al. | |
| 6,229,884 | B1 | 5/2001 | Toyoda et al. | |
| 6,233,317 | B1 | 5/2001 | Homan et al. | |
| 6,233,318 | B1 | 5/2001 | Picard et al. | |
| 6,289,323 | B1 * | 9/2001 | Gordon et al. | 705/40 |
| 6,549,892 | B1 * | 4/2003 | Sansone | 705/401 |
| 6,557,755 | B1 * | 5/2003 | Pickering et al. | 235/376 |

FOREIGN PATENT DOCUMENTS

| | | |
|---|---|---|
| WO | 99/21330 | 4/1999 |

OTHER PUBLICATIONS

PS Form 2865, downloaded Jan. 26, 2003, from the University of Michigan web site.*

* cited by examiner

METHOD AND SYSTEM FOR PROVIDING VALUE-ADDED SERVICES

FIELD OF THE INVENTION

The present invention relates generally to mailing systems and methods. More particularly, the present invention is directed to mailing systems that provides value- added services incorporated into the international processing of a mailpiece.

BACKGROUND OF THE INVENTION

Postal systems have been designed and created to foster communication between individuals and business entities. Typical postal service communications have been in hard copy format; however, recently, electronic communication such as e-mail, internet, computer facsimile and digital telephony have become significant methods of communication. These communications have been mixed, forming what is known in the art of postal services as "hybrid mail". One such example of hybrid mail is traditional facsimile in which hard copy and electronic messaging are combined. While electronic mail is typically faster and more economical than traditional mail, it proposes security concerns and legal concerns. Whereas traditional mail may be slower, it is more accessible to a broader range of individuals, offers proof necessary for many daily transactions and, in some instances, it is more effective than electronic mail. However, there are several occasions when the advantages of electronic communication and the advantages of traditional mail may be combined to provide a more effective communication solution.

To this end, postal systems have grown to provide a variety of value-added services associated with mailpiece delivery. One recognized purpose of sending a mail item is to solicit a reply message from a recipient or service provider. Such a reply message may be a response to the message contained in the mail item or a service type message having to do with sending and/or delivering and/or receiving the mail item by either the mail recipient or the service provider or both. The requirement to receive confirmation of mail acceptance and/or delivery is particularly common and normally addressed by certified, registered or insured mail. These types of mail are traditionally organized around a physical proof of acceptance and delivery, such as a physical receipt, which is signed by the service provider's clerks and/or the mail recipient and physically delivered to the mail originator (mailer).

The postal services incur considerable cost for such value-added service, and the mailer is charged a fee that is significant in comparison to the cost of regular delivery of the mail item. For example, when a mailer requests a return receipt, the recipient of the mail signs a card stating that the mail has been received. This card is physically delivered back to the original mailer as acknowledgement of mail receipt from the recipient. Such physical proofs of acceptance and delivery are economically inefficient and time-consuming. Most, if not all, postal systems require individual, manual handling of special services mail. These systems are considerably more expensive than automated mail processing systems which are based on machine readability of information present on mail items.

As of 1998, almost 20% of the population in the United States and other industrialized countries, in general, have access to electronic mail via Internet. Even a higher number of mailers use facsimile regularly. These numbers are expected to grow dramatically. Although such electronic communications provide speed and efficiency over the physical delivery of mail, there is no indication that such electronic communications will replace the physical delivery of mail. Heretofore, such electronic communications have been an alternate form of communication to the physical delivery of mail.

U.S. patent application Ser. No. 09/339,768, assigned to the assignee of the present invention, discloses value-added services based on electronic confirmation of service for only the mail items communicated between the original mailer and the originating post office. It was envisioned that mail items would be of an international nature, yet the performance of special services would continue to be directly communicated between the mailer and the originating post office. This application discloses the concept of electronic confirmation of delivery in the preferred embodiment which involves printing by the mailer his/her electronic address (where he/she would like to have confirmation to be sent electronically) on the mail item itself. This electronic address may be encrypted in the digital postal mark, printed in a plain text form, or in a machine readable format in such a manner that this electronic address can be captured effectively and reliably from the mail item by any convenient data capture device, e.g., optical scanner. In an alternate embodiment, unique mailer identification (which is typically printed in the digital postage marks or other proof of postage payment indicia) can serve as a pointer to a database of mailer's registered electronic addresses, and the electronic address for confirmation can be retrieved from such a database. Also, the electronic address would typically have to be pre-registered for a mailer to enjoy value-added services and would not work with mailers who prefer to use stamps and not register with postal authorities for digital postage payment evidencing solutions such as PC-based and other digital meters. However, the system of the present invention would work with any method of payment.

Specifically, Digital Postage Marks (DPM) (a.k.a. digital indicia, a.k.a. information based indicia) are computerized information printed or otherwise attached to a mail item to provide evidence of payment to a verification authority (e.g., the United States Postal Service). This type of information, generally referred to as postal data, preferably includes identification of the metering device (or licensee) responsible for the payment, unique identification of mail item, value of various accounting registers, location of the mail deposit/mailer's account, postage value, and may include other desired information. Such information is typically protected by a cryptographically generated validation code known as CPVC (Cryptographic Postage Validation Code). Another way to protect DPM is by supplying the verification authority with the value of the validation code (Postage Validation Code or PVC) prior to mail submission as described in U.S. Pat. No. 5,612,889, assigned to the assignee of this application. This means that a mail item is sent by a mailer in one country to a recipient in another country, and the sender would like to request performance of a value-added service, for example, confirmation that the mail item was delivered to a mail box of the recipient or actually received by the recipient or a member of the household of that recipient. This also contemplates a broad variety of desired services and confirmations. Typically, in this case, the mail item itself must be handled by several postal operators or carriers including at least the carrier of first handling (typically the postal operator of the country where mailpiece originates) and the carrier of the last handling (typically the postal operator of the country where the mailpiece is delivered to the recipient) and possibly carriers operating in other intermediate countries.

The problem remains in international postal delivery that the postal operator of the first handling may not want to share electronic addresses of its customers with other postal operators (e.g., in the destination country). Sharing of the electronic address, in turn, reveals the first handling postal authority's customer list to subsequent handling postal authorities, who could then usurp the customers and maintain direct communication with the original mailer. The subsequent postal authorities could circumvent the need to communicate through the first handling postal authority to the original mailer and, thus, steal the first handling postal authority's customers. This would result in loss of revenue related to the value-added services provided by the original postal authority and any revenue related to services provided which uses the customer list.

In this case, the postal operator of the originating country would prefer that electronic confirmation concerning a given mail item be sent to the postal operator of the first handling, not directly to the original mailer of the mail item. This postal operator then may electronically forward the confirmation to the original sender of the mail item, thus protecting valuable and confidential electronic addresses of its customers. The system of the present invention provides the ability to satisfy this need of postal operators working in an open and competitive environment.

SUMMARY OF THE INVENTION

In accordance with the present invention, a means is provided to overcome the aforementioned difficulties of performing value-added services requested by an original mailer in an international postal system, without revealing the original mailer's identity other than to the originating postal authority. It has been found that the mailpiece may include information that can be used for other than security and postage payment verification. For example, by including an e-mail address of a postal authority on the mail item, the present invention provides a method and system for an originating postal authority to receive a return message from a subsequent handling postal authority related to the requested value-added service. This information is then electronically delivered to the mailer. Thus, the postal authority saves on the mail cost by adding this attribute to the mailpiece, and the originating postal authority maintains the confidentiality of its customer database in addition to its competitive edge in the marketplace. The savings may also be passed along to the mailer. This invention integrates traditional hard copy and electronic communication into one effective communication system that takes advantage of beneficial features of both traditional mail and electronic mail, while offering end users (i.e., the rate-paying public) a broader selection of communication services.

The present invention provides for the integration of electronic communication information, such as an e-mail address or a telephone, facsimile or pager number, of a first handling postal authority, into either a machine-readable format or direct printing of such information on the mailpiece. This allows the automatic creation and forwarding of service messages (such as delivery confirmation) to the first handling postal authority, which may then be communicated to the original mailer in a confidential and more efficient and expeditious manner. Essentially, any information about a mail item known to the original or subsequent postal authorities can be forwarded to the mailer (or other intended recipient) through an alternate electronic communication channel. This concept can be extended even to the mail item communication message, which typically is hidden from the carrier. Issues arising about confidentiality, message integrity, authentication and non-repudiation may be solved through the implementation of well- known security techniques, such as cryptography. The present invention deals effectively with issues arising based upon confidentiality, message integrity, authentication and non-repudiation.

The system of the present invention assumes that all postal administrations involved have communication means for communicating with each other. This could be private or public communication networks (such as Internet), telephone network and the like. It is assumed that for the purpose of providing cross-border postal services with electronic confirmation, all postal administrators allocate their own electronic address which they supply to all other postal operators involved. In this manner, for example, the USPS knows the electronic address of the Canada Post (e.g., Canada Post Internet Server designed to receive all confirmation messages from USPS) and vice-versa. When mail items are marked as items requiring electronic confirmation of service delivered, and when mail items have machine-readable indicators of originating and destination countries (for example, in the form of the so called license plates), then the postal operator of the destination country can capture from the mail item the license plate information of the originating country and retrieve its electronic address either directly from the mailpiece or from a database of electronic addresses of sister postal operators. The e-mail address or country of origin information may be printed directly on the mailpiece, included in a digital post mark (DPM), or contained within a separate machine-readable indicator. Then, the postal operator of the destination country can send electronic confirmation concerning a specific item to the originating country (or country of the first handling).

When such a confirmation message arrives, the postal operator of first handling must then forward this message to the original mailer. This would require at least the knowledge of the mailer's electronic address. If the mailer is pre-registered with the postal operator of the first handling and mailer's electronic address is stored in a database indexed by mailer's identity information, then the required electronic address can be retrieved. In this case, the postal operator of the final handling postal authority, the country of final or last handling, should provide in its message to operator of the country of the first handling at least the identity of the original mailer, and they may also provide the identity of the mail item. Mailer identity and mail item identity may be accompanied by necessary confirmation information about the proof of service provided, such as, for example, digital image of the recipient's signature and mail piece digitally signed by special private key of the public key cryptographic system of the postal administration of the country of last handling.

If the original mailer has not pre-registered his/her electronic address with the postal operator of the country of first handling, then an alternate mechanism may be used. For example, the mailer creates and imprints (or otherwise attaches) to the mail item a machine-readable block of data. This block of data would contain mailer's electronic address for receiving confirmation encrypted with a public key of the specially designated private-public key pair of public key cryptographic system of the postal operator of the country of first handling. This block of data could be accompanied by mail item identification, when required. The mail piece digital image in some cases can provide sufficient identification to the sender.

This block of data would be captured by the postal operator of the country of last handling and communicated as an image to the postal operator of the country of the first handling. This latter postal operator, upon receiving the image electronically together with other appropriate information (e.g., digital image of the recipient's physical signature and mail piece digitally signed by a special private key of the public key cryptographic system of the postal administration of the country of last handling) will interpret and decrypt the block using its own private key to obtain MEA (Mailer's Electronic Address), Mailroom ID and MailerID. The information MailItemID and MailerID together with confirmation information described will be forwarded to the original mailer using its electronic address MEA. The entire process is completely automated.

Other methods for protecting confidentiality of the electronic address and other information concerning original mailer (e.g., MailItemID) and MailerID) are possible as well and are within the spirit and the scope of the present invention. For example, a symmetric key system can be used for encryption, whereby a secret key can be shared between mailers and postal operators of the country of first handling, or public key transport mechanism can be used to create and share a session private key between originating mailer and postal operator. Many different ways are adequately described in *Handbook of Applied Cryptography* by A. Menezes, P. Van Ooorshot and S. Vanstone, CRC Press, 1997.

It should be expressly noted that the described system allows for a natural mechanism to provide address correction services. Namely, if the intended recipient of the mail item moved and a mail carrier responsible for delivery is in possession of a new address of the intended recipient, the mail carrier can key in the new address and transmit it electronically together with a confirmation form or without it to the original mailer. This and other features and variations of the present invention are entirely within its scope and spirit.

Therefore, it is now apparent that the present invention substantially overcomes the disadvantages associated with the prior art. Additional advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

The present invention provides a system and method for integrating value-added services information into a mail item to provide a more economical and efficient method of providing such value-added services. Although the present invention is described below as an e-mail implementation, it will be understood by those skilled in the art that a viable alternative includes substituting a mailer's pager number so that a pager notification of mail receipt can be used along with some other receipt data. Other viable alternatives include facsimile or automated voice response notification. Furthermore, the present invention is described for a mail item that is delivered by a postal service. It will be understood by those skilled in the art that the present invention can be used with any carrier that physically delivers any item. It will be further understood that for such other carriers, the communication information that is described herein is integrated in any manner to any part of the item being physically delivered. For example, the information may be part of any machine-readable code, a bar code, DPM, or may be in plain text. It will be further understood that the system and method of the present invention apply to any mail items, including but not limited to, letters, flats, parcels, irregular parcel post, etc.

Figure 1:
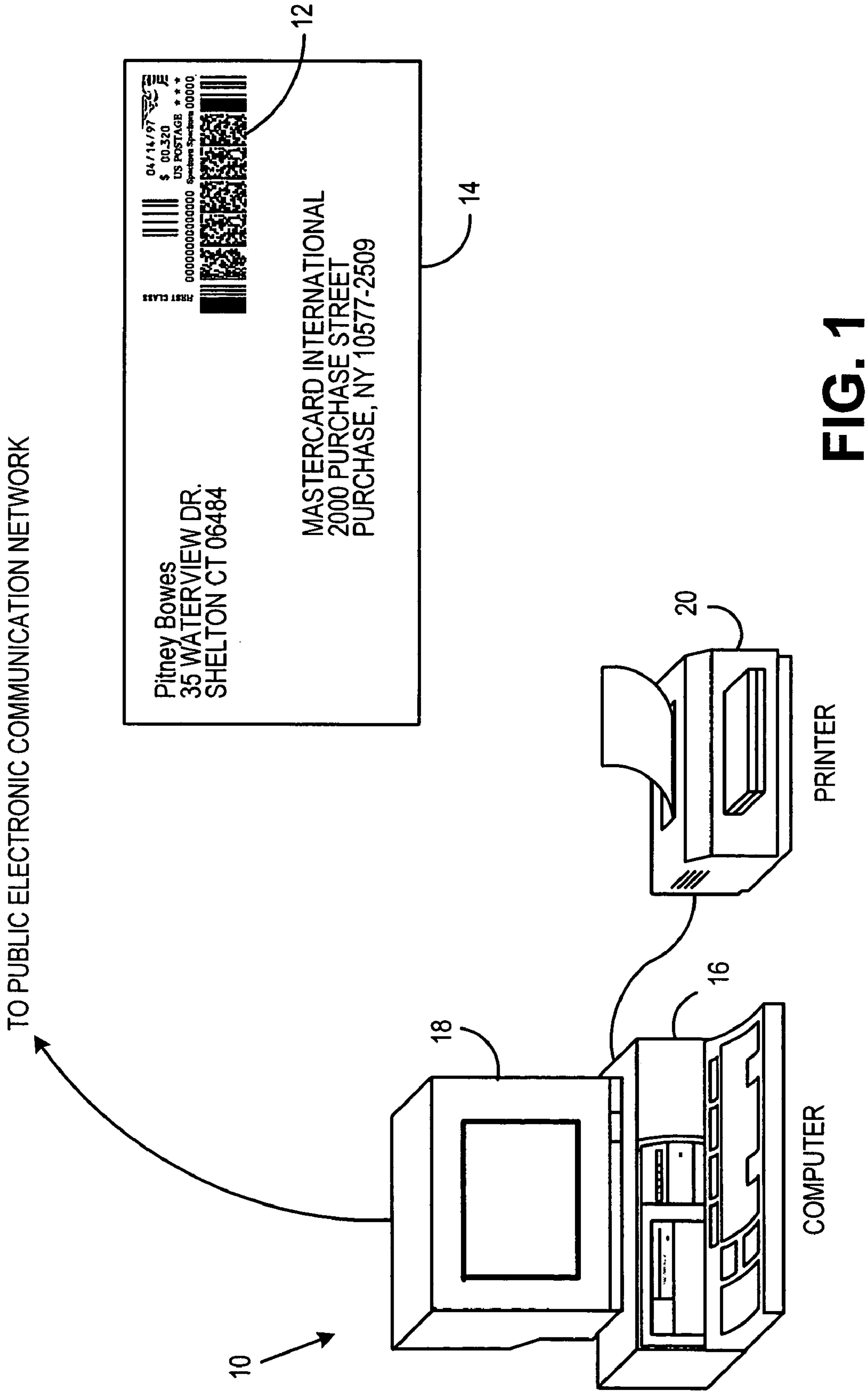
FIG. 1 is a schematic of a prior art PC metering system as an example of a mail generation subsystem that creates and prints a DPM in accordance with the present invention.

Referring now to FIG. 1, a schematic of a prior art PC metering system, generally designated 10, is shown as an example of a mail generation system that creates and prints a mark 12 on mail item 14 in accordance with the present invention. In accordance with the present invention, mark 12 may include a two-dimensional bar code that contains conventional IBIP information, includes first handling postal authority indicator, value-added services information, such as confirmation notification information, and a-mailer identity information. PC meter 10 includes conventional PC 16, display 18 and printer 20. See U.S. Pat. No. 5,781,438, assigned to the assignee of this application, which is hereby incorporated by reference for a more detailed description of a PC metering system.

Figure 2:
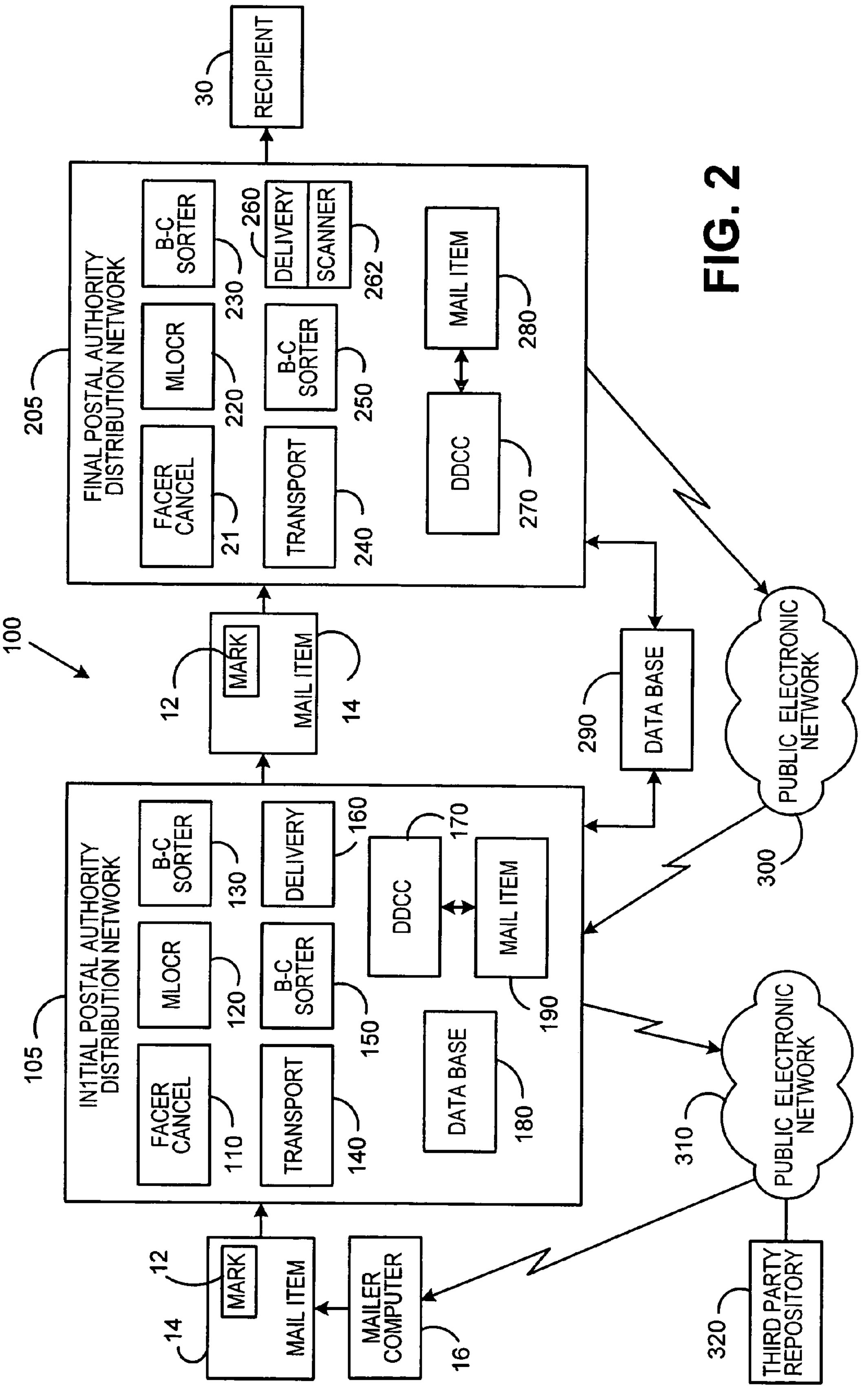
FIG. 2 is a block diagram of a postal distribution network in accordance with the present invention.

Referring now to FIG. 2, a block diagram of the system of the present invention is shown. The system includes an international postal distribution network, generally designated 100, which processes a mail item 14 that is originated by the mailer. The mailer may write the letter by hand or use mailer's PC computer system 10 and deliver mail item 14 to a first handling postal authority. If written by hand, a machine-readable block of dates is provided on the mailpiece at the postal authority. If the mail item is created on the mailer's own computer, and the mailer is pre-registered, then the machine-readable code may be generated and printed by the mailer's computer. In this instance, the mailer's electronic address may be stored in a database identified by the mailer's identity information. If the mailer is not pre-registered, the machine readable code includes an electronic address encrypted with a public key of a specially designated public-private key part of the public key cryptographic system of the first handling postal authority. This information may also be combined with a mail item identification, if needed. The mail item is then delivered to at least one more postal authority before reaching intended recipient 30. For illustrative purposes, this block diagram depicts only a first and a final handling postal authority. During the delivery process, value-added services information is captured in accordance with the present invention.

The first handling postal authority distribution network 105 includes conventional components such as: facer/canceller 110; MLOCR (multi-line optical character reader) sorters 120 that typically perform a primary sort for mail items that have not been presorted; intermediate bar-code sorters 130, postal transport means 140 for transporting the mail item from one postal facility to another; final bar code sorters 150; and delivery means 160, such as a mail carrier delivery to a mailbox. In accordance with the present invention, first handling postal authority distribution network 105 further includes a digital data capture scanner and processing computer system 170 that is optionally coupled to one or more of the aforementioned components of the first handling postal authority distribution network 105 for the purpose of maintaining information, including value-added services information, that is provided during processing.

The final handling postal authority distribution network 205 includes conventional components such as: facer/canceller 210; MLOCR (multi-line optical character reader) sorters 220 that typically perform a primary sort for mail items that have not been presorted; intermediate bar-code sorters 230; postal transport means 240 for transporting the mail item from one postal facility to another; final bar code sorters 250; and delivery means 260, such as a mail carrier delivery to a mailbox. Delivery means 260 includes a scanner 262 for scanning mark 12 at the time of delivery. In accordance with the present invention, final handling postal authority distribution network 205 further includes a digital data capture scanner and processing computer system 270 that is optionally coupled to one or more of the aforementioned components of the final handling postal authority distribution network 205 for the purpose of capturing and processing information, including value-added services information, that is read from the mark of the mail item being processed. As information is captured by digital data capture scanner and processing computer system 270, a mail item file 280 (described in detail below) is created. Final handling postal authority distribution network 205 determines the electronic address of first handling postal authority distribution network 105 from either a direct scanning of mark 12 of the mailpiece 14 or, preferably, by scanning mark 12 of mailpiece 14 for the first handling postal authority distribution network 105 identity and using database 290 for determining first handling postal authority distribution network 105 electronic address. If database 290 is implemented, changes in addresses may be made efficiently because the data table, rather than each postal authority, would require updating. Depending on the value-added services being processed, digital data capture scanner and processing computer system 270 communicates mail item file 280 through a public electronic communications network 300 to be used by the first handling postal authority's digital data capture scanner and processing computer system 170 to update mail item file 190. Communications network 300 may be any conventional communications network, such as the Internet or a cellular/conventional telephonic network, or any combination thereof depending on the type of communication information read from the mark.

Digital data capture scanner and processing computer system 170 of first handling postal authority distribution network 105 then determines the address of the original mailer using database 180 and communicates the stored mail item file 190 through use of public electronic communication network 310 to the mailers computer systems 10 or a trusted third party repository 320. The communication between mailer and the first handling postal authority is maintained confidential such that the final handling or any other postal authority is not provided access to the original mailer's electronic address.

Figure 3:
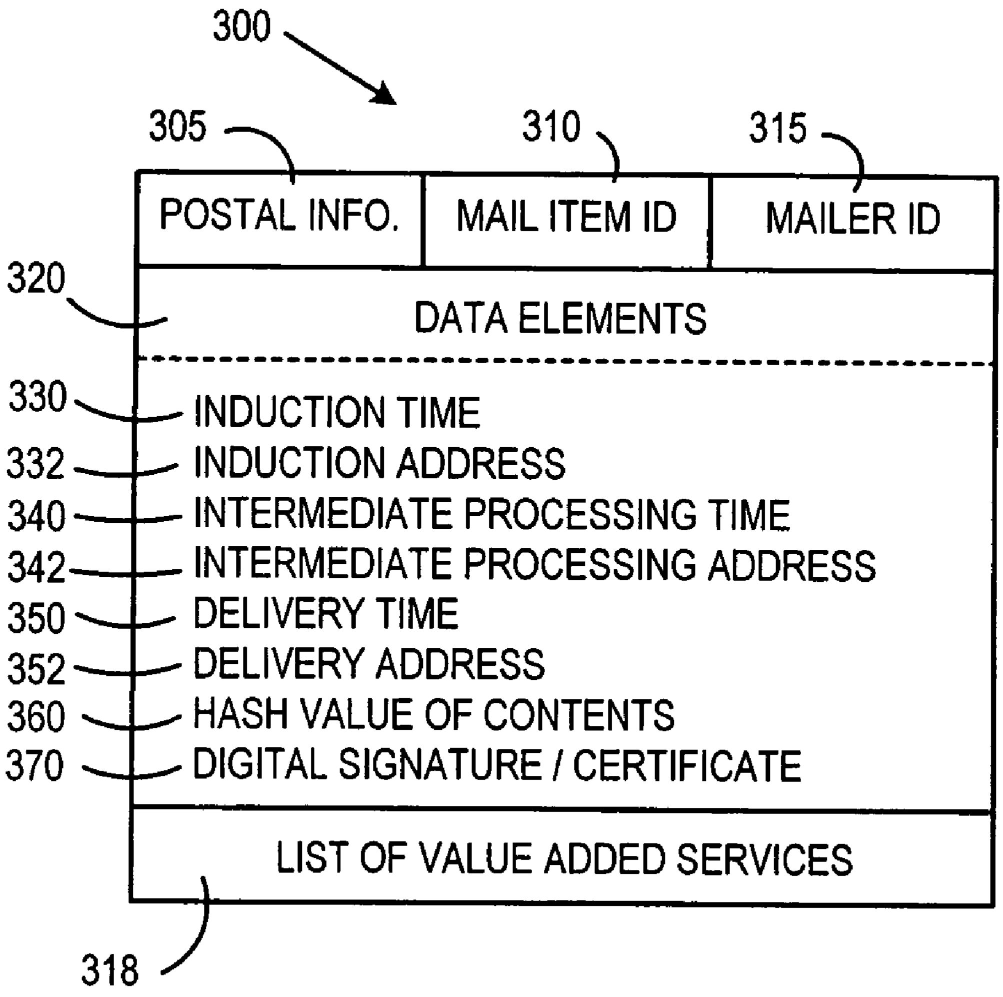
FIG. 3 is a block diagram of a mail item file created in the present invention.

Referring now to FIG. 3, a block representation of mail item file 190 that is created upon initial processing by first handling postal authority distribution network 105, then updated by final handling postal authority distribution network 205 and delivered to first handling postal authority distribution network 105 and finally, delivered to the original mailer computer 16. Mail item file 190 may include: a header 305 of postal information that has been captured from mail item 14; a mail item identification number 310; mailer ID 315; and a list 318 of value-added services requested. The present invention provides for one or more of such requests. Mail item file 190 further includes various data elements 320 that are optionally captured depending on the value-added services requested. Data elements 320 may include induction time 330 and induction address 332 indicating when and where mail item 14 enters the postal distribution network 100; intermediate processing times 340; and intermediate processing addresses 342 indicating various stages of processing within the international postal distribution network 100, and delivery time 350 and delivery address 352 indicating when and where the mail item leaves the postal distribution network 100. Data elements 320 may further include information captured when the mark 12 was read, such as a hash value 360 of the contents of mail item 14 and a digital signature and/or certificate 370.

Figure 4:
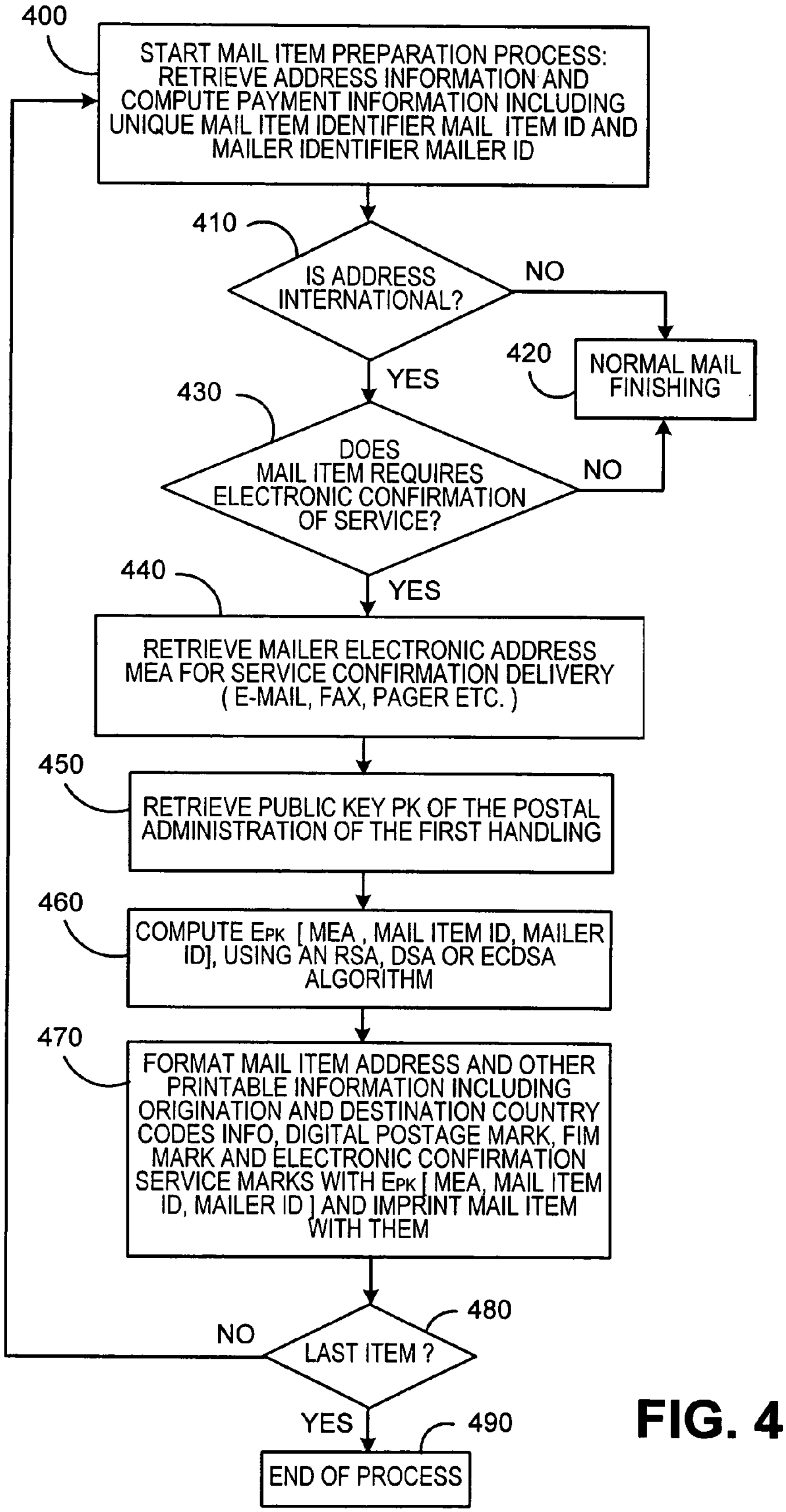
FIG. 4 is a flow chart of a process of creation of mail items according to present invention.

Now turning to FIG. 4 there is shown a flow chart of the process of creating a mail item according to the present invention. At step 400, the mail item preparation process begins. Address information is retrieved and payment information is computed including the unique mail item identifier (MailItemID) and mailer identifier (MailerID). At step 410, the process queries as to whether or not the retrieved address is international. If the answer to the query at step 410 is "no," then the process continues to step 420 where the mail item is processed through normal mail finishing. If, however, the answer to the query at step 410 is "yes," then the method continues to step 430. At step 430, the process queries as to whether or not the mail item requires an electronic confirmation of service. If the answer to the query is "no," then, the process continues to step 420 where the mail item is processed through normal mail finishing. If, however, the answer to the query at step 430 is "yes," then the method continues to step 440 where a mailer electronic address (MEA) is retrieved for service confirmation, such as an e-mail fax or pager address. At step 450, a public key (PK) of the postal administration of the first handling is retrieved. At step 460 using an RSA, DSA or an ECDSA algorithm, $[E_{PK\ [MEA,MailItemID,MailerID]}]$ is computed. $E_{PK}$ [MEA, MailItemID, MailerID], where E stands for operation of encryption, is the result of encryption of MEA, MailItemID, and MailerID. PK is a public key of the specially designated private-public key pair of public key cryptographic system of the postal operator of the country of first handling; MEA is Mailers Electronic Address; MailItemID is a unique identity of the mail item; and MailerID is a unique identity of the mailer. The encryption operator E can be RSA, DSA or ECDSA or any other appropriate reversible type as described, for example, in (many different way are adequately described in *Handbook of Applied Cryptography*, by A. Menezes, P. Van Ooorshot and S. Vanstone, CRC Press, 1997.)

At step 470, the process formats the mail item address and other printable information including, the origination destination country code information, digital postmark, FIM mark and electronic confirmation service marks along with $[E_{PK\ [MEA,MailItemID,MailerID]}]$ and imprints them on the mail. At step 480, the process queries as to whether or not the mail item processed was the last mail item. If the answer to the query at step 480 is "no," then the process returns to step 400. If, however, the answer to the query at step 480 is "yes," then the mail preparation process ends.

Figure 5:
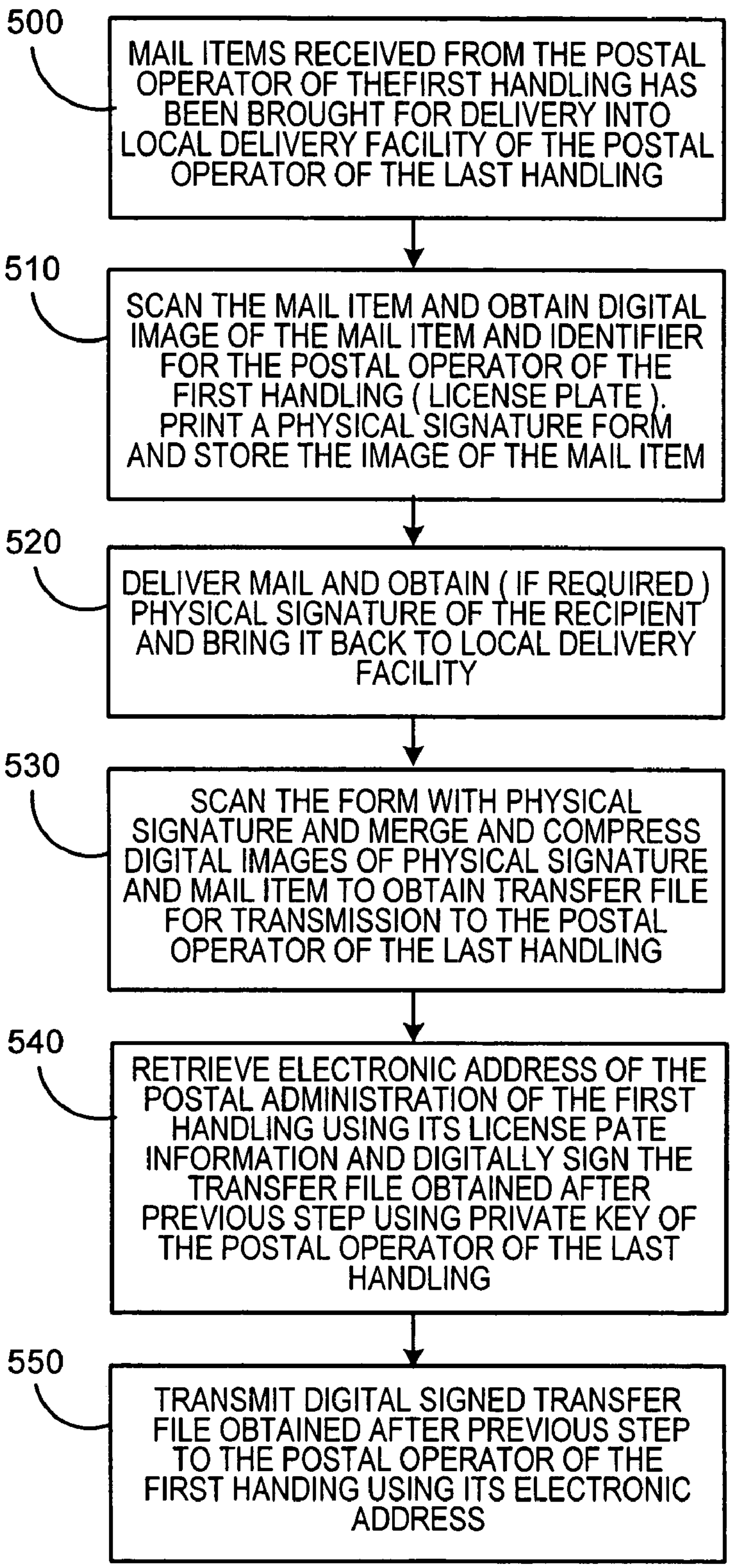
FIG. 5 is a flow chart of the process performed by the postal operator of the last handling.

Now turning to FIG. 5, there is shown a flow chart of the process performed by the postal operator of the last handling of the mailpiece. At step 500, the mail item which has been received from the postal operator of the first handling is brought into the local delivery facility of the postal operator of the final handling. At step 510, the mail item is scanned, and a digital image of the mail item and an identifier (the license plate) for the postal operator of the first handling are obtained. At the same time, a physical signature form is printed, and the image of the mail item is stored. At step 520, the postal operator of the final handling delivers the mailpiece to the intended recipient and, if required, obtains a physical signature of the recipient. The paper and information detailing delivery are brought back to the local deliver facility. At step 530, the form which includes the physical signature is scanned to obtain a digital image. The digital image of the physical signature and the mail item are then merged and compressed to obtain a transfer file which is to be transmitted to the postal operator of the first handling.

At step 540, the postal operator of the final handling retrieves the electronic address of the postal administrator of the first handling using the license plate information and digitally signs the received transfer file using a private key of the postal operator of the last handling. At step 550, the digitally-signed transfer file is transmitted to the postal operator of the first handling using the electronic address of the postal operator of the first handling as obtained form step 540.

Figure 6:
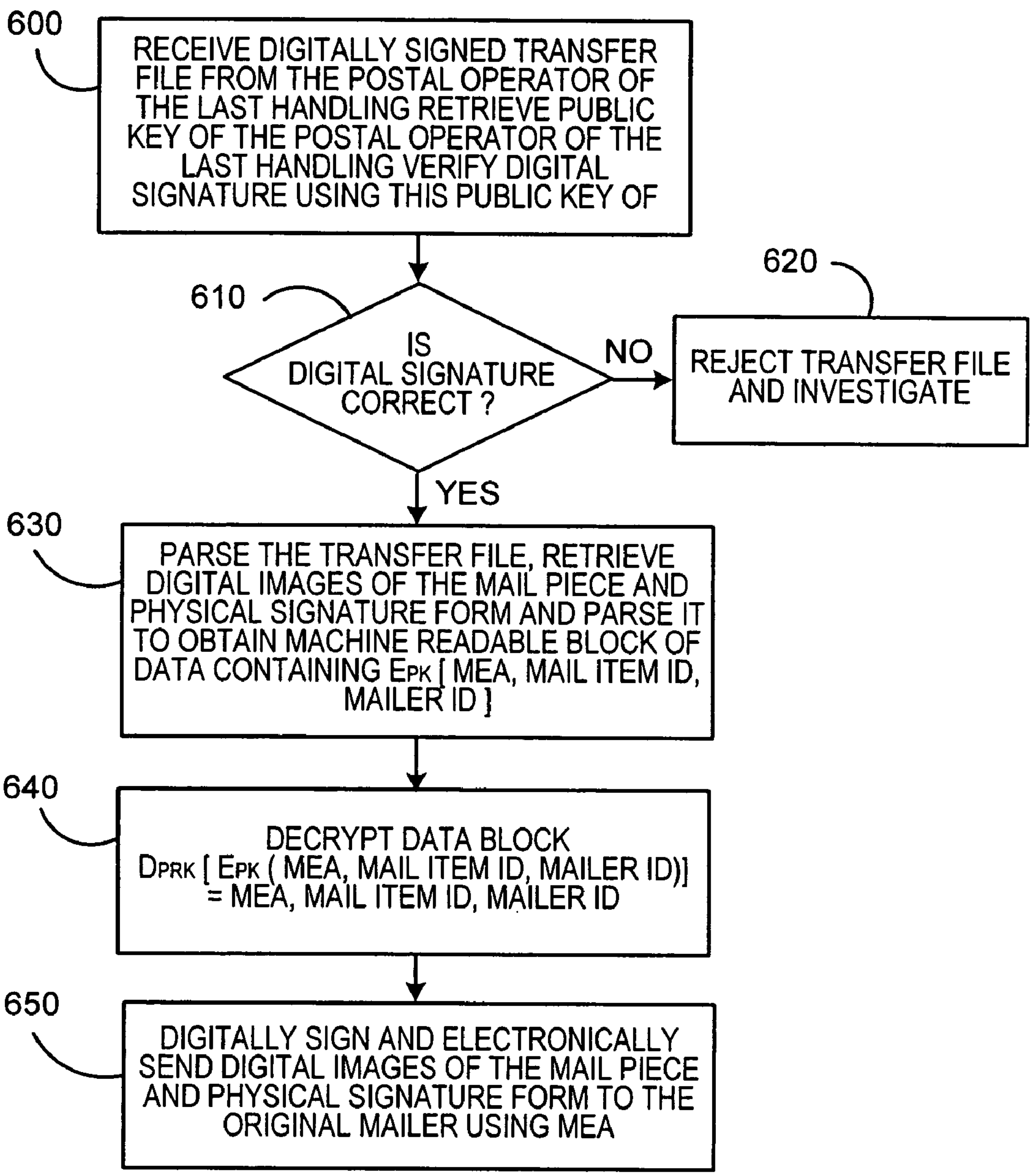
FIG. 6 is a flow chart of the process performed by the postal operator of the first handling upon having received an electronic confirmation from the postal operator of the last handling.

Now turning to FIG. 6 is shown a flow chart of the process performed by the postal operator of the first handling upon having received an electronic confirmation from the postal operator of the last handling. At step 600, the postal operator of the first handling receives the digitally signed file transferred from the postal operator of the last handling and retrieves the public key from of the postal operator of the last handling and verifies the digital signature using the public key. At step 610, the determination is made as to whether or not the digital signature is correct. If the answer to the query at step 610 is "no," then the method progresses to step 620 where the transfer file is rejected, and an investigation commences. If, however, the answer to the query at step 610 is "yes," then the method progresses to step 630, where the transferred file is parsed, and the digital images of the mailpiece and physical signature form are retrieved and are parsed to obtain a machine readable block of data containing $E_{PK\ [MEA,MailItemID,MailerID]}$]. At step 640, the process is directed to decrypt the block $D_{PRK}$ $[E_{PK\ [MEA,MailItemID,MailerID]}]$=MEA, MailItemID, MailerID. At step 650, the process digitally signs and electronically sends the digital images of the mailpiece and physical signature form to the original mailer using the MEA. The invention has been described herein above has referenced a first and a final handling postal authority, however, it is to be appreciated that the invention may also be practiced at intermediate handling postal authorities.

This process in a formal notation looks as follows: $D_{PRK}$ $[E_{PK}$ [MEA, MailItemID, MailerID]]=MEA, MailItemID, MailerID, where D stands for operation of decryption, and PRK is the private key of the specially designated private-public key pair of public key cryptographic system of the postal operator of the country of first handling.

It must be expressly noted that, in some cases, it would be sufficient to forward to the original mailer only the image of the mail item together with the image of physical signature form (for the confirmation of receipt service) without MailItemID. Also in some cases, MailerID is redundant with Mailer's Electronic Address (MEA) if each mailer has only one electronic address. It should be also expressly noted that the postal operator of the last handling may digitally sign all files transmitted to the postal operator of the first handling for the purpose of protecting integrity and authenticity of data as it is usually done. Also, it may be necessary to preserve legality of proofs of electronic delivery.

Many features of the embodiments disclosed herein represent design choices selected to exploit the inventive concept as implemented in a particular mailing system environment. However, those skilled in the art will recognize that various modifications can be made without departing from the spirit of the present invention. Therefore, the inventive concept in its broader aspects is not limited to the specific details of the preferred embodiments described above, but is defined by the appended claims and their equivalents.

What is claimed is:

1. A system for providing value-added services relating to the distribution of a mailpiece within an international mailing system comprising:

a) a first database of mailer electronic addresses indexed by mailer identification codes;

b) a second database of postal authority addresses indexed by postal authority identification codes;

c) a means for incorporating a request for a value-added service and a mailer identification code on a mailpiece;

d) means for creating at a first postal authority a mail item file corresponding to the mailpiece; said mail item file including said mailer identification code and said value-added service request;

e) means for determining, at a second postal authority, said first postal authority address; and f) means for performing by said second postal authority said value-added service;

g) means for communicating said performance of said value-added service to said first postal authority using said first postal authority address, wherein said first postal authority determines a mailer electronic address using a mailer identification code associated with the mailpiece and communicates performance of said value-added service to the mailer using the mailer electronic address.

2. The system as claimed in claim 1 wherein said mailer identification code is encrypted.

3. The system as claimed in claim 1 wherein said first database includes said mailer e-mail address.

4. The system as claimed in claim 1 wherein said second database includes said postal authority e-mail address.

5. The system as claimed in claim 1 wherein said value-added service request is a confirming electronic message.

6. The system as claimed in claim 2 wherein said set of data relating to value-added service request includes a facsimile number.

7. The system as claimed in claim 2 wherein said value-added service request is an electronic confirmation of receipt.

8. A method for providing value-added services requested by a mailer and relating to the handling of a mailpiece by a plurality of postal authorities, the method comprising:

receiving a mail item at a final handling post;

scanning the mail item to obtain a digital image of the mail item and an identifier for an initial handling post;

obtaining a digital image of a signature of a recipient of the mail item as confirmation of delivery of the mail item;

merging the digital images of the signature and the mail item; and transmitting the merged digital images to the initial handling post.

9. The method of claim 8 comprising the further step of:

transmitting delivery confirmation from the initial handling post to a mailer of the mail item.

10. The method of claim 8 wherein the step of obtaining the digital image of the signature of the recipient includes the steps of:

obtaining a physical signature on a form; and scanning the physical signature to obtain the digital image of the signature.

11. The method of claim 8 wherein the step of transmitting the merged digital images to the initial handling post includes the steps of:

retrieving an electronic address corresponding to the initial handling post;

compressing the merged digital images to form a transfer file;

digitally signing the transfer file; and transmitting the digitally signed transfer file to the initial handling post using the electronic address.

12. The method of claim 11 wherein the electronic address is one of an e-mail address, a facsimile number and a telephone number.

13. The method of claim 9 wherein the step of transmitting delivery confirmation from the initial handling post to the mailer of the mail item includes the steps of:

retrieving an electronic address of the mailer; and sending an electronic message to the mailer confirming delivery of the mail item.

14. The method of claim 13 wherein the electronic address is one of an e-mail address, a facsimile number, a pager number and a telephone number.

15. A method for providing value-added services requested by a mailer and relating to the handling of a mailpiece by a plurality of postal authorities, the method comprising:

receiving electronically at an initial handling post a transfer file representing confirmation of delivery of a mail item by a final handling post;

parsing the transfer file to retrieve digital images of the mail item and a signature of a recipient confirming delivery of the mail item; and sending to the mailer confirmation of delivery of the mail item.

16. The method of claim 15 wherein the transfer file is digitally signed by the final handling post, the method comprising the further steps of:

verifying the digital signature of the transfer file; and rejecting the transfer file if the digital signature is not correct.

17. The method of claim 15 wherein the confirmation of delivery is sent to a mailer electronic address, the mailer electronic address being one of an e-mail address, a facsimile number, a pager number and a telephone number.

18. The method of claim 15 wherein the step of parsing the transfer file includes parsing from the transfer file a mailer electronic address, a unique identity of the mail item and a unique identity of the mailer.

19. The method of claim 15 wherein the step of parsing the transfer file includes parsing from the transfer file a unique identity of the mail item and a unique identity of the mailer; and the step of sending to the mailer confirmation of delivery of the mail item includes determining a mailer electronic address from a look up table.

20. The method of claim 15 wherein the step of sending to the mailer confirmation of delivery of the mail item includes the step of:

sending electronically digital images of the mail item and signature of the recipient.

21. The method of claim 17 wherein digital images of the mail item and the signature of the recipient are digitally signed before being sent.

* * * * *